F. HEAVENER.
CAR-COUPLING.

No. 192,915. Patented July 10, 1877.

WITNESSES:
A. W. Almqvist
J. H. Scarborough

INVENTOR:
F. Heavener
BY
ATTORNEYS.

UNITED STATES PATENT OFFICE.

FLOYD HEAVENER, OF LARAMIE CITY, WYOMING TERRITORY.

IMPROVEMENT IN CAR-COUPLINGS.

Specification forming part of Letters Patent No. 192,915, dated July 10, 1877; application filed April 2, 1877.

*To all whom it may concern:*

Be it known that I, FLOYD HEAVENER, of Laramie City, in the county of Albany, Wyoming Territory, have invented a new and Improved Car-Coupling; and I do hereby declare that the following is a full, clear, and exact description of the same, reference being had to the accompanying drawing, forming part of this specification, in which—

Figure 1:
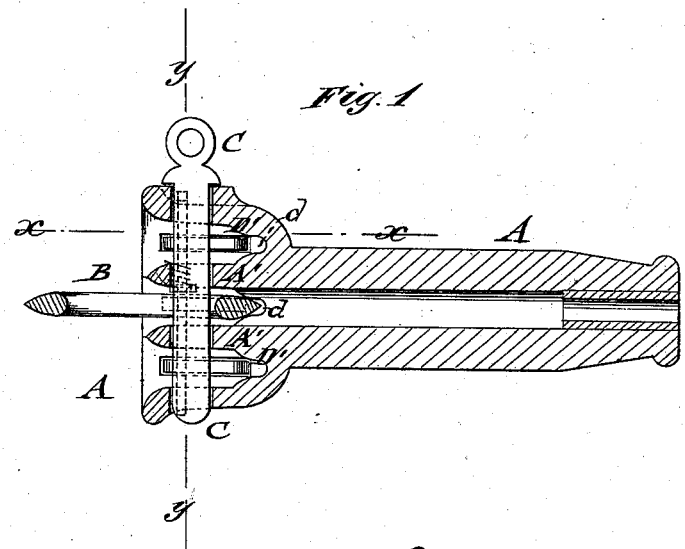
Figure 2:
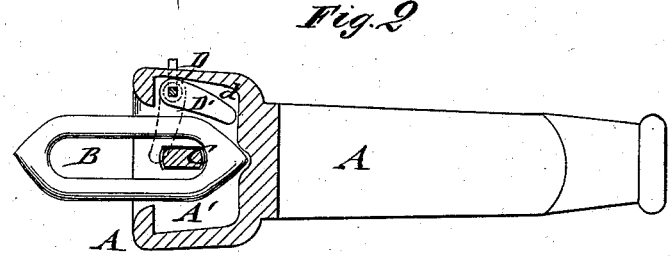
Figure 3:
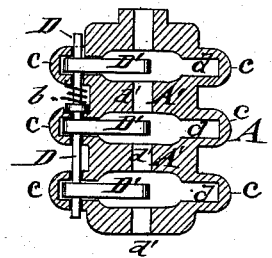

Figure 1 is a vertical longitudinal section. Fig. 2 is a sectional plan view, the section being taken through line $x\ x$ of Fig. 1; and Fig. 3 is a vertical transverse section through line $y\ y$ of Fig. 1.

My invention relates to an improved car-coupling, adapted to couple automatically with cars of different heights of draw-bars, and with cars having the ordinary form of link-and-pin coupling.

My invention has reference to two old types of couplings. One of these types embodies a horizontal spring-arm attached to a vertical pivot-rod, and arranged to support the coupling-pin, which spring-arm is deflected by the entering link, and, by being thrust from beneath the pin, allows the latter to fall through and couple the link. The other embodies a draw-head with a tier or series of throats, the one above the other. My improvement consists, mainly, in combining these two features, for the purpose hereinafter described; and, also, in the particular construction and arrangement of parts, whereby certain advantages are secured, as more fully set forth with reference to the drawing hereinafter.

In the drawing, A represents the draw-bar, which is enlarged at its front end, and provided with horizontal partitions A', which form a tier or vertical series of throats with tapering mouths. Each of these throats is formed alike, of two dimensions—that is to say, the central portion of the throat is made of such depth and width as to receive the coupling-link B, while all around the larger portions of the throat, both upon the back, as seen in Fig. 1, and upon the sides, as in Fig. 3, are formed recesses $d$, which are narrower or less deep in vertical direction than the central portion of said throats. Around these narrow portions of the draw-bar, upon the sides, the metal is allowed to project, as at $c$, which projections are perforated upon one side in vertical direction, to receive and form bearings for a vertical pivot-rod D. Said rod is made square, and is provided with a collar, which rests upon one of the projections $c$, to hold it in position, and to said rod are attached arms D', which are made with a square perforation, so as to rock rigidly with the rod, and yet be capable of longitudinal movement to permit the separation, removal, and replacement of the parts. These arms correspond in number to the throats, and project laterally from the rod in horizontal position across the mouths of the throats, so as to be struck by the entering link. Said arms are held to their positions across the throats by the tension of a spiral spring, $b$, wound about the rod D, but are capable of being deflected so as to occupy a nearly longitudinal position with the draw-bar in the narrow side recesses $d$. The link B is both tapered and pointed at the ends, to secure its more certain passage into the mouths of the draw-bars, and the coupling-pin C, which is adapted to pass through the perforation $d'$, is made slightly flattened in the vertical longitudinal plane of the draw-bar.

For automatic coupling it will be seen that the arms D' are allowed to maintain, from the action of spring $b$, a position at right angles to the draw-bar across the throats, in which position the coupling-pin C is supported upon the top arm D'. Now, upon the entrance of the link in any one of the throats, one of the arms is deflected, and with it the bar D is rocked, and as the arms pass into the recesses $d$, the top arm is removed from its position below the pin C, which latter, being unsupported, drops down through the link and effects the coupling in an automatic manner, regardless of the height of the draw-bar of the car to be coupled, and without the necessity of going between the cars with its attendant risk.

In relation to the combining of the two features in my invention, I would state that the laterally-projecting spring-pressed arm, arranged to support the coupling-pin and be deflected by the entering link to permit the pin to drop through and couple the link, is not new, the same being shown in the patent to Green, No. 62,028; but this coupling is adapted only to cars having draw-bars of a given height. A draw-bar, moreover, having a series of throats is also old, the same being shown in the patent to Grassler, No. 120,430. In this latter case the vertical arm of a weighted elbow-lever extends through all of the throats, and, when struck by a link entering any one of the throats, moves the slide at its upper end, which supports the coupling-pin, and allows said pin to fall through the link. With this arrangement, however, it will be seen that the leverage to be overcome and degree of movement which the entering link has in striking the vertical arm of the elbow-lever varies much between the upper and lower throats by reason of the impact upon the lever at different distances from its pivot, and hence the coupling of cars of different heights of draw-bar is not uniformly effected, the coupling-strain for the lower throat being great and the movement small, while for the upper throat the reverse is true.

By multiplying the coupling of Green and combining it with the draw-bar of Grassler, it will be seen that I secure the new result of coupling-cars irrespectively of the varying heights of draw-bars always with a uniform movement of the link and impact of the coupling devices, the arms D' all bearing the same leverage, and representing alike the tension of the spring b. This difference is for the most part distinctive with respect to Grassler. A distinction with respect to Green is, that in my invention the pin is not necessarily supported by the arm which is struck by the link, which, in some cases, might be objectionable.

With respect to the tapering and pointed link, I would further state that such is not new, except when combined with a draw-bar of my construction having the narrow recesses d around the link-throats. With this form of draw-bar, made with a series of throats, it is especially desirable that the link should be always tapered and pointed, in order to secure its certain passage into the throat without hitching or jamming, and if it were allowed to strike with its tapered end the back part of the draw-bar or chafe against the sides of the same in turning it would soon become dull and blunted. The recesses d coact then with the form of link in that they prevent the end of the link from ever striking the draw-bar in entering or in turning, and, by making contact with the link upon its sides, prevent its tapered end from ever becoming dulled.

Another advantage of my invention is due to the location of the bar D in the projection c. The bar D is by the arrangement outside of the draw-bar, where it is easily accessible for the removal and replacement of the various parts, and while the projections c form bearings for the rod D, they also protect it against abrasion, and give room for the recesses d, that receive the arms D' and co-operate with the link.

Having thus described my invention, what I claim as new is—

1. The draw-bar A, having a vertical series of throats, and the vertical pivot-bar D, having a corresponding series of rigid spring-actuated arms, D', of equal leverage, projecting horizontally across the throats, in combination with each other and with the coupling pin and link, substantially as described.

2. The draw-bar A, having one or more throats, with narrower or reduced recesses d upon the sides and back, opening into the said throats, in combination with a tapered link, substantially as and for the purpose described.

3. The draw-bar A, having a series of throats with reduced recesses d upon the back and sides, in combination with the pivot-bar D, having rigid arms D', adapted to be moved laterally into said recesses by the entering link, substantially as and for the purpose described.

4. The combination, with the pivot-bar D, arranged upon the outside of the draw-bar and provided with arms D', of the draw-bar A, having projections c formed about the recesses d upon the sides, to constitute bearings for and protect the rod D, substantially as described.

5. The rod D, having rigid arms D', and provided with a supporting-collar and a spring, in combination with the draw-bar, having a series of throats, as described, with projections c formed about the recesses d of the throats, adapted to support the collar of rod D, substantially as described.

6. The combination, with the draw-bar having a series of throats with projections c, of the rod D, arranged outside the draw-bar in the projections, with a supporting-collar and a spring, b, and the arms D', made to rock rigidly with the bar upon its axis, and to slide thereon longitudinally for the separation, removal, and replacement of the parts, as described.

FLOYD HEAVENER.

Witnesses:
J. M. INGERSOLL,
C. H. BUSSARD.